Aug. 17, 1943.    H. TEETOR    2,327,078
BEVERAGE SET
Filed June 5, 1939    2 Sheets-Sheet 2
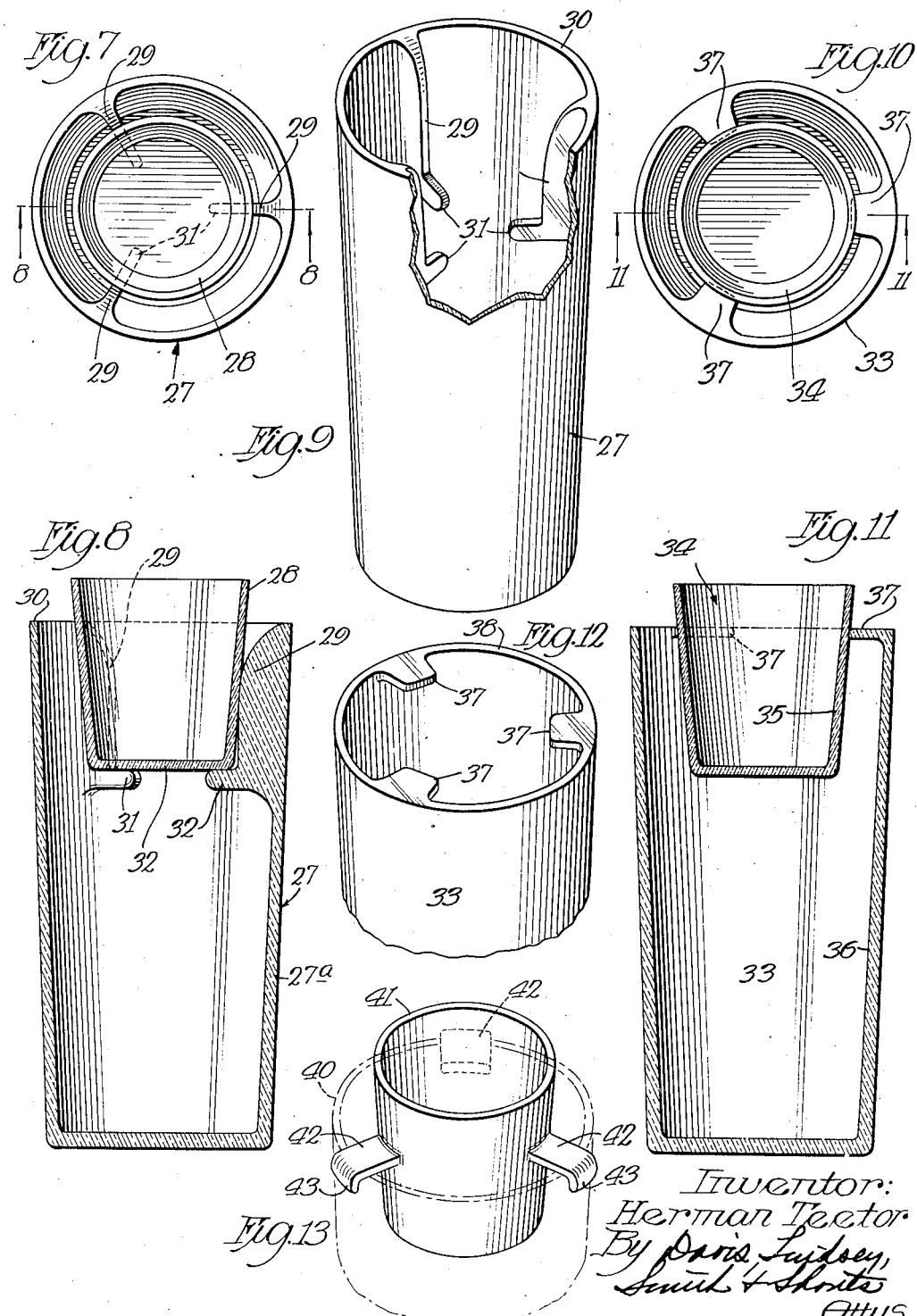
Inventor:
Herman Teetor
By Davis, Lindsey,
Smith & Shonts
Attys.

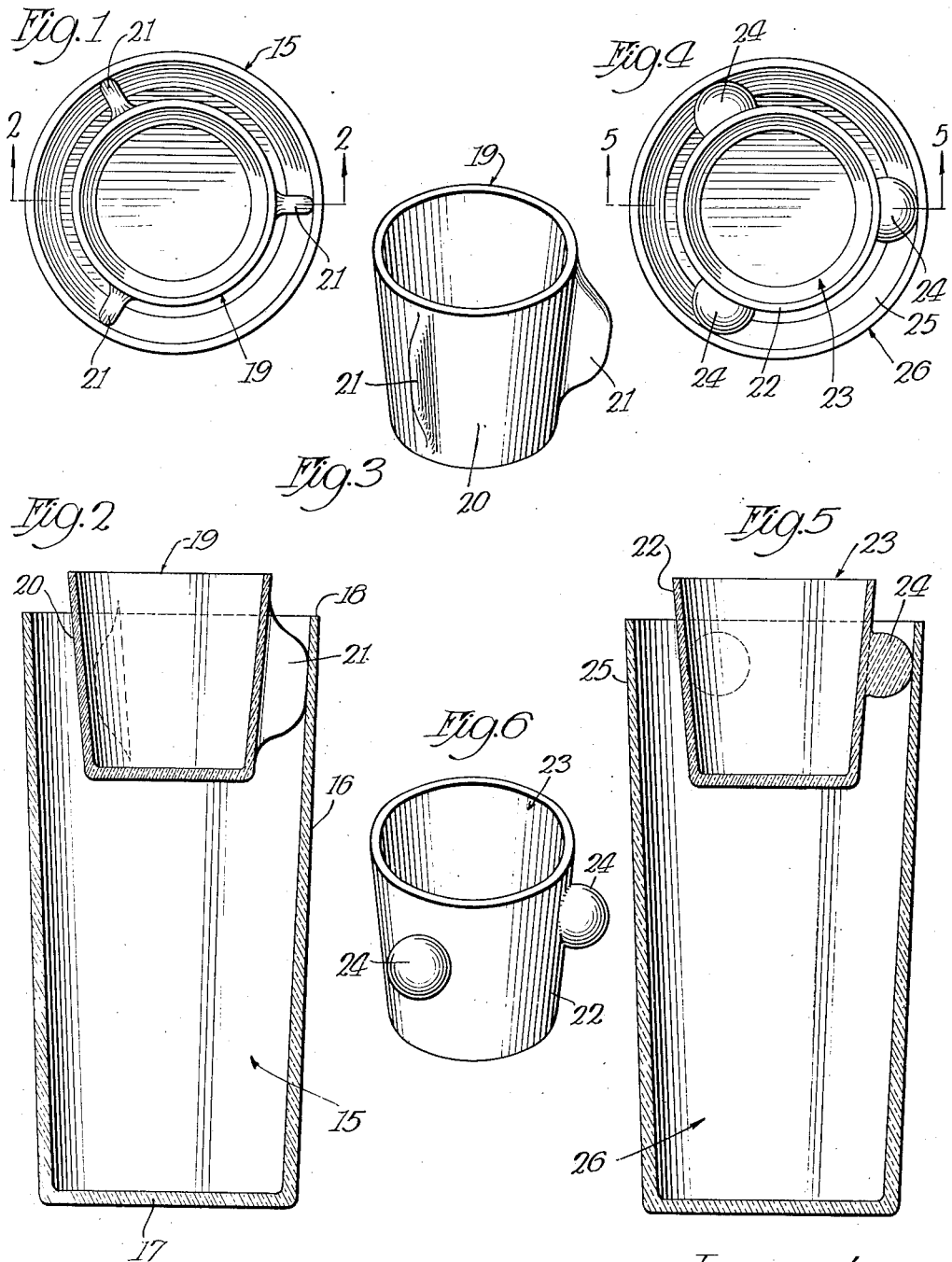

Patented Aug. 17, 1943

2,327,078

UNITED STATES PATENT OFFICE 2,327,078

BEVERAGE SET

Herman Teetor, Hagerstown, Ind.

Application June 5, 1939, Serial No. 277,411

6 Claims. (Cl. 65—13)

My invention relates to beverage sets including so-called jiggers or measuring glasses and so-called set-up glasses.

In the serving of mixed beverages, particularly where one of the ingredients thereof is liquor, it is customary to serve the liquor in measured quantity in a separate jigger or measuring glass so that one may mix the beverage himself or may have it mixed in his presence. It is also customary to separately serve a so-called set-up glass along with the jigger on a tray or the like and, in doing so, the contents of the jigger, or part thereof, are often spilled with resultant waste. Also, by serving in the foregoing manner, only a few persons may be served at one time by a given tray space and confusion as to the proper beverage for a particular person often takes place.

One of the objects of my invention is to provide a beverage set that is adapted to eliminate the foregoing objectionable conditions, which set is constructed and arranged to avoid waste of the beverage ingredients, to conserve tray space so that one person may readily serve a greater number of persons at one time, and to facilitate the serving of the proper beverage to a specified person.

Another object is to provide a beverage set including a so-called set-up glass or receptacle and a jigger or measuring receptacle of such size and shape that it may readily be inserted within the open end of the set-up glass, means being provided for supporting the jigger removably within and in spaced relation to the set-up glass so that the jigger may readily be inserted within and removed from the set-up glass and, in the event of spilling of the contents of the jigger, they will be deposited directly within the set-up glass without waste.

A more specific object is to provide a beverage set including a pair of drink serving receptacles, one of which is adapted to be received within the other, and one of the receptacles is provided with supporting elements adapted to engage the other receptacle for supporting the receptacles in spaced relation with the upper edge of the inner receptacle projecting somewhat above the upper edge of the other receptacle.

Other objects and advantages will become apparent as this description progresses and by reference to the drawings wherein—

Figure 1 is a top plan view of one form of beverage set embodying my invention;

Fig. 2 is a section taken substantially on line 2—2 of Fig. 1;

Fig. 3 is a separated perspective view of the jigger or measuring receptacle shown in Figs. 1 and 2;

Fig. 4 is a top plan view of another form of beverage set embodying my invention;

Fig. 5 is a section taken substantially on line 5—5 of Fig. 4;

Fig. 6 is a separated perspective view of the jigger shown in Figs. 4 and 5;

Fig. 7 is a top plan view of still another beverage set embodying my invention;

Fig. 8 is a section taken substantially on line 8—8 of Fig. 7;

Fig. 9 is a perspective view, partially cut away, of the set-up receptacle shown in Figs. 7 and 8;

Fig. 10 is a top plan view of an additional form of beverage set embodying my invention;

Fig. 11 is a section taken substantially on line 11—11 of Fig. 10;

Fig. 12 is a separated perspective view of the upper portion of the set-up receptacle shown in Figs. 10 and 11; and Fig. 13 is a fragmental perspective view of still another form of beverage set embodying my invention.

The structure illustrated in Figs. 1 to 3, inclusive, includes a so-called set-up glass or receptacle 15 having a side wall 16 tapering outwardly from a bottom 17 to its open top edge 18. It further includes a jigger 19 or measuring receptacle of the same shape but of lesser diameter and depth than the glass 15 so that it will readily fit within the open end of such glass in spaced relation to the side and bottom walls 16 and 17 thereof. The jigger 19 is adapted to contain a measured quantity of liquid while the glass 15 may contain ice and/or another drink ingredient with which the contents of the jigger are to be mixed.

In carrying out my invention, the jigger 19 is removably supported within the glass 15 at such a position that it may readily be grasped for removal; and its contents, if spilled, will be deposited directly within the glass 15. To that end, the side wall 20 of the jigger is provided with support elements that take the form of three radially extending wings 21. These wings project vertically from near the top edge of the jigger 19 to near its bottom and they are of such length that their outer or free ends seat against the tapered wall 16 of the glass 15 when the jigger 19 is inserted within the glass 15 to a predetermined depth. Preferably, the wings are of such length that they strike the side wall 16 of the glass 15 at about the point shown in Fig. 2 so that the upper edge of the jigger 19 projects somewhat above the top edge 18 of the glass 15 where it may readily be grasped. The space between the side wall 20 of the jigger and the side wall 16 of the glass 15 is of such width that any liquid that may be spilled from the jigger will be deposited directly into the glass 15. Also, the outer ends of the wings 21 are rounded so that they will seat against the tapering side wall of the glass 15 without wedging action, and the three-legged support provided by such wings insures positive engagement between the jigger and the set-up glass without wabble action that might tend to cause spilling of the jigger contents.

The structure shown in Figs. 4 to 6, inclusive, is similar to that above described except that the side wall 22 of the jigger 23 is provided with three exterior, rounded, bead-like projections 24 that are adapted to strike the inner surface of the tapered side wall 25 of the set-up glass or receptacle 26. With this structure, as in that of Fig. 2, the jigger 23 may readily be inserted within the open end of the glass 26 and, as it is lowered therein to the position shown in Fig. 5, the bead-like members 24 strike the inner side wall of the glass 26 for supporting the jigger 23 therewithin. The supporting elements 24 strike the wall of the glass 26 at such position that the upper edge of the supported jigger 23 projects slightly above the upper edge of the glass 26 where it may readily be grasped for removal.

If desired, a plain-walled jigger may be employed instead of that shown in the previous figures, and the set-up glass may be provided with suitable means for supporting the jigger in spaced relation and at the desired elevation therein. One such structure is shown in Figs. 7 to 9, inclusive, wherein there is employed a set-up glass 27 and a similarly shaped jigger 28 of such smaller size that it may readily be received within the upper open portion of the glass 27. In this form, the set-up glass 27 is provided with three vertically disposed and integral wings 29 uniformly spaced apart and extending radially inward from the inner surface of the side wall 27ᵃ of the receptacle 27. These wings 29 extend downwardly from the upper edge 30 of the glass a distance slightly less than the depth of the jigger 28 and they are provided, at their lower ends, with inwardly extending shelf-like portions 31 upon which the bottom 32 of the jigger 28 is adapted to seat. The wings 29 extend inwardly to such an extent, and they are so rounded that the side wall of the jigger 28 is snugly received therebetween without wedge action. In this way, the jigger 28 is firmly, but removably, seated within the upper open end of the glass 27, with its side wall in spaced relation to the side wall of the glass 27 and with its upper edge projecting above the upper edge of the glass 27 so that its contents, if spilled, will be deposited directly into the set-up glass 27 and it may readily be grasped by the user for ready removal. It will be seen from the foregoing that the structure shown in Figs. 7 to 9, inclusive, affords substantially the same advantages as the previously described structures.

In Figs. 10 to 12, inclusive, there is shown another form of structure which is somewhat similar to that of Figs. 7 to 9, inclusive, and by which substantially the same advantages may be obtained. This structure includes a set-up receptacle 33 and a similarly shaped and plain-walled jigger 34 of such size that it may readily be received within the upper open end of the glass 33 with its side wall 35 in spaced relation to the side wall 36 of the receptacle 33. The side wall 35 of the jigger 34 is tapered as shown in Fig. 11. The jigger 34 is supported in spaced relation within the upper portion of the receptacle 33 by three horizontally disposed fingers or projections 37 that are angularly spaced around and extend inwardly from the upper edge 38 of the glass 33. The fingers 37 are of such length that when the jigger 34 is inserted therebetween, bottom-end-first, the tapered side wall 35 of the jigger will engage the inner ends of the fingers 37 at a point somewhat below the upper open edge of the jigger. In this way, the jigger 34 is so supported that it may readily be grasped for removal and its contents, if spilled, will be deposited within the glass 33.

The beverage set of Fig. 13 includes a plain-walled set-up glass 40 and a jigger or measuring glass 41. The jigger 41 is supported within and in spaced relation to the upper open end of the glass 40 by a plurality of (preferably three) horizontally extending angularly spaced arms 42 that seat upon the top edge of the glass 40. The outer ends of the arms 42 are turned downwardly as at 43, providing stops, so to speak, that engage the side wall of the glass 40 and hold the jigger 41 centered within the glass 40. The arms are so positioned on the jigger 41 that the jigger is positioned with its upper edge projecting above the upper edge of the glass 40 sufficiently to be readily grasped by the user.

It is believed that the manner of use and the advantages of my invention as above first stated will be obvious from the foregoing description. Beverage sets embodying my invention are well adapted for use in the home as well as in public places such as taverns, cocktail parlors, bars, etc. In all such places my invention serves the intended purpose in a highly efficient manner, and the waste and inconvenience of spilled liquor or other liquid is avoided.

I claim:

1. A beverage set comprising a receptacle having an open top and an interiorly tapered side wall, a second receptacle having an open top and a closed bottom and of such size that it may readily be inserted within the open top of said first receptacle, and exterior, radially extending, angularly spaced elements on said second receptacle adapted to frictionally engage the inner side wall surface of said first receptacle when said second receptacle is inserted therein to a predetermined depth for supporting said second receptacle solely under its own weight and the weight of its contents, if any, within and in spaced relation to the side wall of said first receptacle with the open top portion thereof accessible at the open top of said first receptacle.

2. A beverage set comprising a receptacle having an open top and an interiorly tapered side wall, a jigger having an open top and a side wall and of such size that it may be inserted in the open top of the first receptacle with the side walls of said receptacles in spaced relation, and radially extending, wing-like, angularly spaced members projecting exteriorly from the side wall of said jigger, said members being of such length that they engage the inner side wall of said first receptacle upon insertion of said jigger within the open end of said first receptacle, whereby said jigger is removably supported within the first receptacle in spaced relation to the latter and with the open top of the jigger projecting from the open top of the first receptacle where it may readily be grasped for removal.

3. A beverage set comprising a receptacle having an open top and an interiorly tapered side wall, a jigger having an open top and a side wall and of such size that it may be inserted in the first receptacle with the side walls of said receptacles in spaced relation, and a plurality of exterior, angularly spaced, radially extending bead-like elements projecting from the side wall of said jigger below the top thereof, said elements being of such length that they seat against the tapered wall of the first receptacle upon insertion of the jigger within said first receptacle to a predetermined depth less than the depth of said jigger, thereby holding said jigger in spaced relation to the first receptacle and with its open top projecting from the open top of the first receptacle.

4. A beverage set comprising: a large open-ended receptacle having a tapered inner wall surface; and a relatively small receptacle of such size that it may be inserted in the large receptacle, said small receptacle having circumferentially spaced projections on its exterior side wall, said projections having an inclined portion adapted to engage and seat upon an upper portion of the tapered inner surface of said large receptacle to support said small receptacle in the open end of said large receptacle.

5. A jigger for use with an open-ended setup receptacle having an interiorly tapered wall, said jigger comprising a generally cylindrical body portion open at one end and closed at its opposite end; and a series of circumferentially spaced longitudinally extending wings on the exterior of said body portion, said wings having edges cooperable with the upper portion of the interiorly tapered wall of said setup receptacle for supporting the jigger in the upper portion of said setup receptacle.

6. A jigger for use with an open-ended setup receptacle having an interiorly tapered wall, said jigger comprising a generally cylindrical body portion open at one end and closed at its opposite end; and a plurality of circumferentially spaced bead-like projections on the exterior surface of said body, said projections being cooperable with the upper portion of the tapered wall of said setup receptacle for supporting the jigger in the upper portion of said setup receptacle.

HERMAN TEETOR.